ial corrosion.

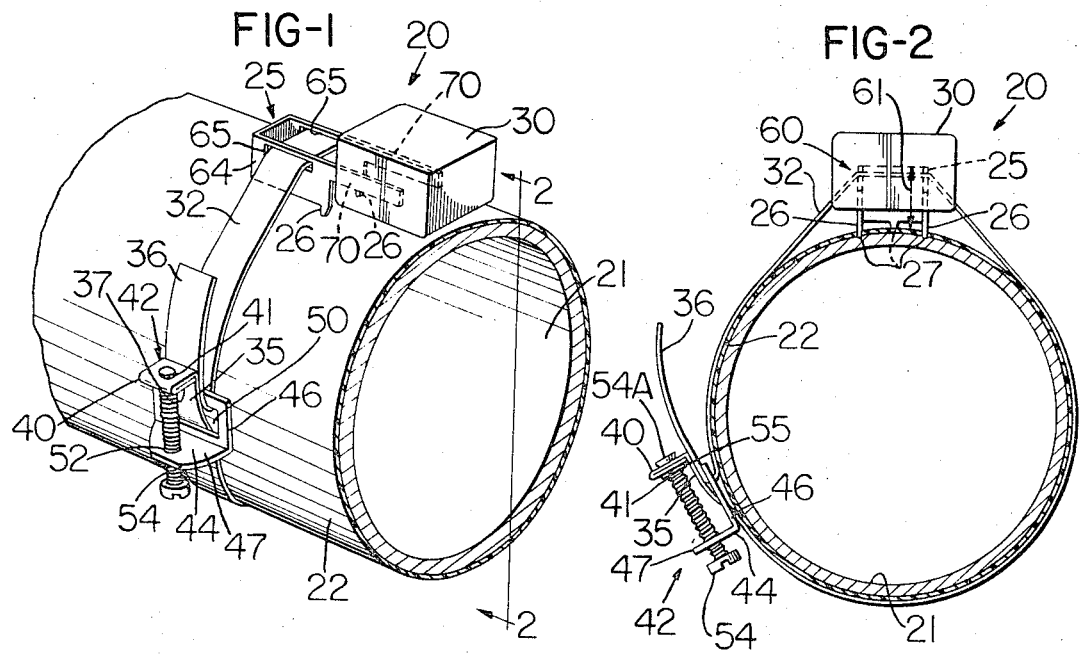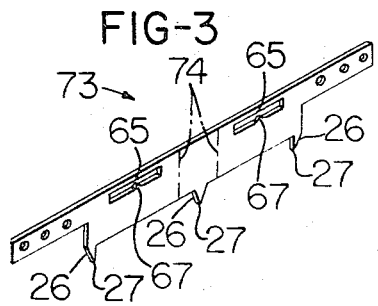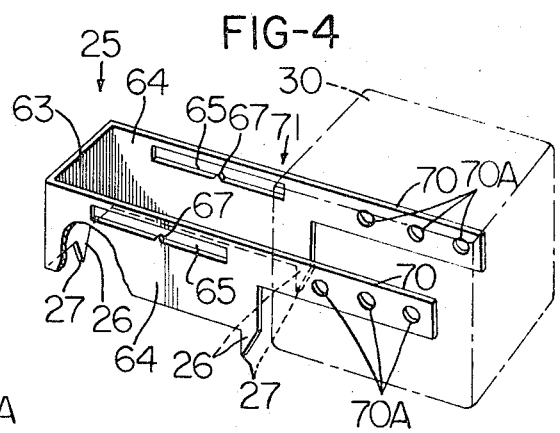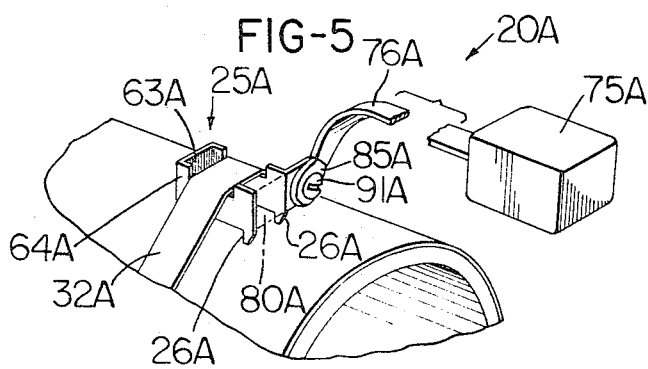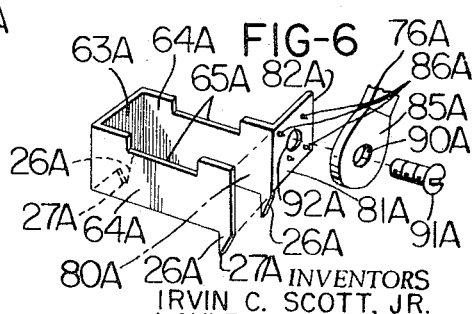

United States Patent Office 3,553,094
Patented Jan. 5, 1971

3,553,094
DEVICE FOR CATHODICALLY PROTECTING A METAL PIPE
Irvin C. Scott, Jr., Richmond, and Layle B. Barker, Henrico County, Va., assignors to Reynolds Metals Company, Richmond, Va., a corporation of Delaware
Filed Apr. 22, 1968, Ser. No. 722,987
Int. Cl. C23f *13/00*
U.S. Cl. 204—197   13 Claims

ABSTRACT OF THE DISCLOSURE

This disclosure relates to a device for cathodically protecting coated metal pipe which comprises a sacrificial anode in combination with simple means enabling such anode to be readily electrically connected to such pipe in the field without requiring special tools or equipment.

BACKGROUND OF THE INVENTION

It has been found that buried elongated members such as metal pipes which have not been adequately protected are subject to electrolytic corrosion wherein the moist earth around such a pipe serves as an electrolyte, and the pipe acts, in effect, as an anode of an electrolytic cell which is subject to substantial corrosion.

Generally, most pipes which are to be buried have some sort of exterior coating applied thereagainst; however, it has been found that such pipes often have small unprotected areas caused by imperfections in their coatings or the coatings are scratched or otherwise marred during handling and installation to create such unprotected small areas which become susceptible to accelerated electrolytic corrosion. To eliminate or substantially reduce the problem of electrolytic corrosion of underground pipes it has been proposed to electrically connect a metallic material, which will be referred to as a sacrificial anode, to the pipe and because the sacrificial anode is made of a metallic material which is more susceptible to electrolytic corrosion than the pipe to which it is electrically connected such sacrificial anode serves to make the pipe cathodic and current flow created by galvanic action serves to deteriorate, sacrifice, the sacrificial anode instead of the pipe. The devices proposed heretofore for providing cathodic protection for underground pipes are either very complicated and expensive to produce and install or must be installed by complicated procedures such as by welding, for example. Further, in existing pipeline installations where the pipes carry combustible fluids it is very dangerous to weld a sacrificial anode to the previously installed pipe which is to be protected.

SUMMARY

This invention provides a simple device for cathodically protecting metal pipes, or similar elongated metallic members, used in buried installations which is of simple and economical construction, easy to install in the field yet in a safe manner, and may be installed on existing or new installations by an unskilled workman using simple tools normally found in any tool kit.

Other details, uses, and advantages of this invention will become apparent as the following description of the embodiments thereof presented in the accompanying drawing proceeds.

BRIEF DESCRIPTION OF THE DRAWING

The accompanying drawing shows present preferred embodiments of this invention, in which FIG. 1 is a perspective view with parts in section and parts broken away illustrating one exemplary embodiment of the device of this invention suitably fastened in position against an associated coated metal pipe;

FIG. 2 is a view on the line 2—2 of FIG. 1;

FIG. 3 is a perspective view of a flat strip of metal utilized to make a contact member comprising the device of FIG. 1;

FIG. 4 is an enlarged prespective view particularly illustrating the contact member of FIG. 1 with a portion thereof broken away and illustrating a sacrificial anode which is cast around a pair of integral extensions extending from such contact member;

FIG. 5 is a perspective view with parts in section and parts broken away particularly illustrating another exemplary embodiment of the device of this invention wherein a sacrificial anode is installed at a location remote from an associated pipe by means of a wire electrically connected between the sacrificial anode and a contact member fastened to such pipe; and FIG. 6 is an exploded perspective view with parts broken away particularly illustrating the contact member comprising the device of FIG. 5 and the manner of attaching the electrical wire to such contact member to enable the sacrificial anode to be installed at a remote location.

DESCRIPTION OF ILLUSTRATED EMBODIMENTS

Reference is now made to FIG. 1 of the drawings wherein one exemplary embodiment of sacrificial anode means of this invention presented in the form of a device designated generally by the reference numeral 20 is illustrated and provided for cathodically protecting a metal pipe 21 which has an outer coating 22 provided thereon and which may be in the form of a protective outer coating. The metal pipe 21 may be made of any suitable metallic material which is electrically conductive and may contain ferrous or nonferrous meals.

The protective coating 22 provided on the pipe 21 may be a comparatively thick organic coating, such as a coating comprised of polyvinylchloride, polypropylene, fluorocarbons, epoxy resin, or bituminous materials, for example. However, inorganic coatings, such as oxide coatings, may also be utilized to form the coating 22. In these instances where the pipe 21 is made of aluminum, a protective oxide coating may be produced by anodizing, or a similar process.

The device 20 includes a contact member 25 used primarily to make electrical contact with the pipe 21 and contact member 25 is made of an electrically conductive material and has projection means shown as a plurality of three projection means or projections each designated by the same reference numeral 26 extending from its lower edge. Each of the projections 26 has a comparatively sharp point 27 so that upon applying a force against the contact member 25 the projections 26 pierce the outer coating 22 and bite into the pipe 21 so as to become embedded in the metal comprising the pipe 21. The biting action also creates a clean new contact surface which further assures that a good electrical contact is provided. It will also be appreciated that in some applications of this invention the lower portions of the projections may be deformed after piercing through the outer coating 22 and engaging the metal of pipe 21 whereby a comparatively large contact area is produced to again assure a good electrical contact.

The device 20 has a sacrificial anode 30 suitably electrically connected to the contact member 25 and the sacrificial anode 30 in the exemplary device 20 is formed as an integral part of the contact member 25 in a manner to be described subsequently. The sacrificial anode 30 may be made of any suitable material which in a given environment is electrochemically more active than the metal pipe to be protected. When the pipe 21 is made of aluminum sacrificial anodes made of materials containing zinc or magnesium, for example, may be utilized to protect such pipe.

The device 20 includes a fastener 32 which extends circumferentially around the pipe 21. The fastener 32 serves the dual purpose of urging the projections 26 so they penetrate through the coating 22 to provide the previously mentioned firm electrical connection or contact between the contact member 25 and the pipe 21 and such fastener 32 also holds the projections 26 and hence the contact member 25 in firm electrical contact with the pipe 21.

The fastener 32 may be in the form of an elongated member such as a fastening band which has a pair of end portions 35 and 36 which are adapted to be looped circumferentially around the pipe 21. In this example of the invention the end portion 35 has a terminal end 37 overlapped thereagainst so as to define a double thickness portion designated by the reference numeral 40 and an opening 41 is provided through the double thickness portion 40 for a purpose to be described in detail subsequently.

The device 20 also has means for adjustably tightening the fastener 32 against the pipe 21 and such tightening means is designated generally by the reference numeral 42. The tightening means assures that the projections 26 are urged through the coating 22 to provide the desired electrical contact between the contact member 25 and the pipe 21. The tightening means 42 comprises a cooperating bracket and bolt assembly which includes a bracket 44 and a cooperating threaded bolt 54, both of which will now be described in detail.

The bracket 44 has a pair of legs 46 and 47 and the leg 46 has an opening 50 extending therethrough. The leg portion 47 of L-shaped bracket 44 has a threaded opening 52 extending therethrough and upon pulling the double-thickness portion 40 through the opening 50, the opening 41 in double-thickness portion 40 and threaded opening 52 in bracket 44 are arranged in aligned relation. The threaded bolt 54 is threaded through the threaded opening 52 and its terminal end is then attached to portion 40 as will now be described.

The threaded bolt 54 has an integral necked-down terminal end of substantially cylindrical configuration. A washer 55 is also provided and the cylindrical terminal end of bolt 54 extends through an opening in the washer 55 and through the opening 41 in the double-thickness portion 40 whereupon the cylindrical terminal end of bolt 54 is riveted to portion 40 as shown at 54A to thereby attach the end of bolt 54 to end portion 35 of the fastener 32. The riveting at 54A and the dimensions of the cylindrical end of bolt 54 and opening 41 are such that the bolt 54 is freely rotatable with respect to double-thickness portion 40 while being firmly attached thereto.

As seen in FIG. 1, the terminal end portion 35 of the fastening band 32 with bracket 44 and bolt 54 attached in position is placed against the outer periphery of the pipe 21. The fastening band 32 is then looped around the pipe 21 and the end portion 36 is pulled through the opening 50 and between end portion 35 and the pipe 21 whereby end portion 35 is effective in holding end portion 36 urged toward the pipe 21.

Upon rotating the bolt 54 so that it extends through the threaded opening 52 in bracket 44 the effect is to draw the fastening band 32 more tightly against the outer circumference of the pipe 21. It will be appreciated from the construction illustrated that the end portion 36 is arranged between the terminal end portion 35 of fastening band 32 and the pipe 21 and as bolt 54 is tightened end portion 35 tends to urge end portion 36 of the fastening band 32 more tightly toward the pipe 21 thereby preventing slippage between the end portion 36 of fastening band 32 and the bracket 44.

The tightening means 42 enables the fastening band 32 to be adjustably tightened so as to urge the contact member 25 against the pipe 21 with practically any desired force merely by controlling the amount that the threaded bolt 54 is tightened. In addition, it will be appreciated that the construction of the adjustable tightening means is such that the free end 36 may be pulled very rapidly through the opening 50 of bracket 44 after placing bracket 44 and end portion 35 in position. This enables rapid placement of the fastening band 32 so that it is positioned snugly against the outer circumference of the pipe 21 so that upon tightening the bolt 54 the effect is to immediately exert great force against the fastening band 32 to tension it against the pipe 21 and urge the projections 26 through the coating 22 and in firm electrical contact with the metal pipe 21.

The contact member 25 is positioned so that it is sandwiched between the fastening band 32 and the metal pipe 21 and the contact member 25 has an outer portion indicated by the reference numeral at 60 which is arranged a sufficient distance, designated by the reference numeral 61, away from the outer periphery of the pipe 21 so that upon tightening the bolt 54 (and hence the band 32) a substantial force acts against the member 25 and urges it substantially radially inwardly toward the center of the pipe 21, i.e., the force component acting against the contact member 25 tending to move it radially inwardly is comparatively large. It will be appreciated that the height 61 is controlled so that the amount that the device 20 projects outwardly of the circumference of the pipe 21 is kept to a minimum yet a sufficient height 61 is provided to assure that upon tightening the band 32 the force component acting against the contact member 25 which is exerted radially toward the center of the pipe 21 is comparatively large.

The contact member 25 is a substantially U-shaped member having a bight 63 and a pair of legs each designated by the numeral 64 extending outwardly therefrom, see FIG. 4. The outwardly extending legs 64 have a pair of cutouts each designated by the same reference numeral 65 provided therein in aligned relation and the cutouts are adapted to receive fastening band 32 therethrough.

In this exemplary embodiment of the invention the fastening band 32 has a substantially rectangular cross-sectional outline and each cutout 65 is in the form of a cutout opening having a rectangular cross-sectional outline which corresponds to the cross-sectional outline of the fastening band 32 so that the fastening band 32 may be readily inserted through the cutout openings 65 and assure that the member 25 is held firmly against the pipe upon fastening the band 32 in its position. In particular, upon inserting the fastening band 32 through the cutout openings 65 it will be appreciated that the member 25 can not be moved axially along the pipe 21 and relative to the fastening band 32.

In many applications of this invention the fastening band 32 is made of metal which is electrically conductive. In such applications each leg 64 of contact member may be provided with an integral projection 67 which extends upwardly within its cutout 65 and each projection 67 is adapted to pierce and become embedded within an associated portion of the fastening band 32 to assure a good electrical contact between the contact member 25 and the fastening band 32, so that the anode 30 is able to protect the fastening band 32 as well as the pipe 22 even if the fastening band 32 is protectively coated.

It is to be understood that more than one projection 67 may be provided in each arm 64. Also, in many applications the fastening band 32 may be made of a suitable material which does not conduct electricity and in this latter instance the projections 67 are preferably eliminated from the contact member 25.

The sacrificial anode 30 comprising the device 20 is formed as an integral part of the contact member 25 as previously mentioned. Each of the legs 64 of the substantially U-shaped contact member 25 has an extension designated by the reference numeral 70 extending from its terminal end adjacent the top indicated at 71 of the member 25. The sacrificial anode 30 is preferably formed as an integral part of the contact member 25 by being cast around both extensions 70 extending from the legs 64 of the member 25.

By casting the sacrificial anode 30 so that it forms an integral part of member 25, i.e., the extensions 70 of member 25 are cast within the sacrificial anode 30, it will be appreciated that optimum electrical contact is provided between the sacrificial anode 30 and the member 25. Thus, upon forcing the projections 26 of the member 25 through the coating 22 and in firm electrical contact with the metal pipe 21 the sacrificial anode 30 is also electrically connected to the metal pipe 21 in a secure manner.

Each extension 70 has a plurality of openings 70A extending therethrough. Upon casting the extensions 70 within the sacrificial anode 30 the material comprising the anode 30 flows through the openings 70A while it is in a liquid state and upon solidification such material provides an integral attachment which assures the sacrificial anode 32 and the contact member 25 can not be pulled apart. In many applications it may be desired to provide sawtooth edges along the top and/or bottom of each extension 70 for the same purpose of preventing separation of the contact member 25 and the sacrificial anode 30.

The contact member 25 of this example of the invention is made from a flat strip of metal designated generally by the reference numeral 73 and illustrated in FIG. 3. The metal strip 73 may be suitably formed as by blanking or stamping from a flat sheet of metal stock. The strip 73 preferably has the cutout openings 65 and a pair of bend lines each designated by the reference numeral 74 formed therein while it is in the flat form. The bend lines 74 enable bending of the strip 73 thereabout so that each bend line defines the base of an outwardly extending leg 64 of the member 25 with the bight 63 being arranged between the bend lines 74.

Any suitable electrically conductive high-strength material may be used to make the contact member 25. Contact members made of stainless steel have high strength and great hardness and are particularly effective especially when used with pipe 21 made of aluminum.

Another exemplary embodiment of this invention is illustrated in FIGS. 5 and 6 of the drawing. The device illustrated in FIGS. 5 and 6 is very similar to the device 20; therefore, the device of FIGS. 5 and 6 will be designated generally by the reference numeral 20A and parts of the device 20A which are identical to the corresponding parts of the device 20 will be designated by the same reference numerals as in device 20 also followed by the letter designation A and not described again. Only those component parts of device 20A which are different from corresponding parts of device 20 will be designated by a new numeral also followed by the letter designation A and described in detail.

The main difference between device 20A and device 20 is that the device 20A has a sacrificial anode 75A which is located at a location remote from the contact member 25A and the sacrificial anode 75A is electrically connected to the member 25A by a suitable electrical connector which, for ease of description, will be referred to as a wire 76A which is suitably electrically connected to the sacrificial anode 75A and the member 25A. The wire 76A preferably has a comparatively large cross-sectional area and optimum conductivity so as to provide minimum resistance to electrical current flow therethrough and the sacrificial anode 75A may be cast around the terminal outer end of wire 76A so as to provide a strong connection and optimum electrical contact therebetween.

The contact member 25A is also substantially U-shaped and has a bight 63A and a pair of outwardly extending legs 64A which are quite similar to members 63 and 64 respectively of member 25 and as previously described.

The contact member 25A also has a plurality of projections 26A extending from its lower end portion in a similar manner as provided on member 25.

Although the cutouts 65 provided in member 25 are in the form of cutout openings the cutouts 65A provided in member 25A are in the form of substantially rectangular cutout notches and it will be seen from FIG. 5 of the drawing that the fastening band 32A need not be inserted in position but may be merely urged toward the member 25 and placed within the cutouts 65A. The cutouts 65A assure that the member 25A is held firmly against the pipe and prevent movement thereof with respect to the fastening band 32A.

In some applications of this invention it may be desirable to form the contact member 25A with a substantially tubular configuration to give it greater strength and rigidity. This may be readily achieved by providing an end portion 80A, shown by dotted lines, and fastened between the terminal outer ends of legs 64A. End portion 80A may be formed as an extension in one of the legs 64A.

The contact member 25A also has an integral surface 81A which in this exemplary embodiment of the invention is provided on a flange 81A extending from the terminal end of one of its legs 64A and preferably in a direction transverse to the associated leg 64A. The surface 81A provides an electrical contact area for an electrical connector 85A suitably fixed to the terminal end of the wire 76A. The integral surface 81A has a plurality of protrusions each designated by the reference numeral 86A extending outwardly therefrom and the protrusions 86A are adapted to pierce and assure electrical contact with the wire 76A upon attaching the connector 85A to the flange 82A.

The connector 85A has an opening 90A extending therethrough which is adapted to receive an attaching member such as a threaded bolt 91A and the bolt 91A is adapted to be threaded into a threaded opening 92A provided in the flange 82A. Upon inserting the bolt 91A through the opening 90A and threading such bolt through the threaded opening 92A the connector 85A and wire 76A are attached to member 25A. A positive electrical contact is assured between connector 85A and member 25A because the protrusions 86A are forced into contact with the connector 85A. In addition, because the sacrificial anode 75A is cast around the opposite end of wire 76A a path of low electrical resistance is provided between the anode 75A and an associated pipe 21A.

It will also be appreciated that the connector 85A of the electrical lead or wire 76A may also be welded to the flange 82A of contact member 25A, if desired.

The device 20A thus assures that the sacrificial anode 75A may be placed at a buried location remote from the point at which the member 25A is attached to the pipe 21 and thereby assures optimum ease of installation not only on new installations but on existing installations. In addition, it is readily possible with the utilization of the device 20A to provide a sacrificial anode having a plurality of electrical wires extending outwardly therefrom and the sacrificial anode thus provided may be of substantially larger size and placed at a convenient location along a buried pipe installation whereupon the plurality of wires extending therefrom may be attached, at spaced apart locations, along the same pipe section or different pipe sections of a particular pipe line.

The devices 20 and 20A provide optimum cathodic protection for buried metal members, such as pipes, and are easy to install in the field by unskilled personnel using only a screwdriver.

The fasteners or fastening bands 32 and 32A may be made of any suitable structural material both metallic and non-metallic, as previously indicated. Fastening bands which are made of strips of plastic which are substantially inert may be used to assure that the electrical connection to the sacrificial anode is not lost due to corrosion and breakage of the fastening band. In addition, it will be appreciated that the component parts of the tightening means 42 such as the bolt 54, bracket 44, etc., may also be made of plastic materials or protected metal parts which have high structural strength yet are not subject to electrolytic corrosion.

While present exemplary embodiments of this invention, and methods of practicing the same, have been illustrated and described, it will be recognized that this invention may be otherwise variously embodied and practiced within the scope of the following claims.

What is claimed is:

1. A device for cathodically protecting a metal pipe which has an outer coating, said device comprising, a substantially U-shaped electrically conductive contact member having a bight and a pair of legs extending therefrom, integral projection means adapted to pierce said outer coating extending from said bight and each of said legs, a fastener engaging said contact member and urging said projection means through said outer coating and in firm electrical contact with said pipe, tightening means comprising one end of said fastener, said tightening means having an opening through which the other end of said fastener may be passed and adjustably secured merely by pulling said other end to form a loop so that upon operating said tightening means the length of said loop may be shortened, and a sacrificial anode electrically connected to said contact member.

2. The device of claim 1 wherein said legs are embedded in said anode.

3. A device as set forth in claim 3 in which each leg of said contact member has a cutout provided therein with said cutouts being arranged in aligned relation and said fastener comprises an elongated fastening band received within said cutouts.

4. The device of claim 3 wherein said cutouts are in the form of cutout openings and said band is received through said cutout openings so that said device may be handled as a unit.

5. The device of claim 3 wherein said tightening means includes a bracket and bolt assembly.

6. In combination: a metal pipe having a protective outer coating and a device for cathodically protecting said metal pipe, said device comprising a substantially U-shaped electrically conductive contact member having a bight and a pair of legs extending therefrom, integral projection means extending from each of said legs and being adapted to pierce said outer coating, a cutout in each of said outwardly extending legs, an elongated fastening band engaging said contact member and urging said projection means through said outer coating and in firm electrical contact with said pipe, said band being received in said cutouts and having at one end tightening means through which its other end may be passed and adjustably secured to form a circumferential loop fitting tightly against said contact member and said outer coating so that upon operating said tightening means the circumferential length of said loop is shortened, and a sacrificial anode electrically connected to said contact member.

7. The combination of claim 6 wherein said projection means are embedded in said pipe.

8. The combination of claim 7 wherein said tightening means includes a bracket and bolt assembly and said bight of said contact member also has integral projection means extending therefrom.

9. A combination as set forth in claim 6 in which said sacrificial anode is electrically connected to said contact member by embedding a portion of said contact member within said sacrificial anode.

10. A combination as set forth in claim 6 in which said contact member is made from a flat strip of metal which has a pair of bend lines which enable bending said strip thereabout with each bend line defining the base of an outwardly extending leg of said U-shaped contact member.

11. A combination as set forth in claim 6 in which said fastening band has a substantially rectangular cross-sectional outline and said cutout in each of said outwardly extending legs is in the form of a cutout opening which has a cross-sectional outline which corresponds to the outline of said fastening band, said cutout openings being arranged in aligned relation and receive said fastening band therethrough.

12. A combination as set forth in claim 6 in which said sacrificial anode is electrically connected to said contact member by a suitable electrical wire electrically connected between said sacrificial anode and said contact member.

13. A combination as set forth in claim 12 in which said contact member has a flange extending outwardly therefrom, said flange having an integral surface provided thereon which supports and provides an electrical contact area for a connector provided on said wire and having at least one integral protrusion extending outwardly from said integral surface which is adapted to pierce and assure electrical contact upon attaching said connector of said electrical wire thereagainst.

References Cited

UNITED STATES PATENTS

| | | | |
|---|---|---|---|
| 3,494,849 | 2/1970 | Hess | 204—197 |
| Re. 23,559 | 9/1952 | Andrus | 204—197 |
| 3,001,924 | 9/1961 | Battis et al. | 204—197 |
| 3,094,366 | 6/1963 | Harmon | 339—251 |
| 3,123,426 | 3/1964 | Leto et al. | 339—251 |
| 3,202,596 | 8/1965 | Canevari | 204—148 |
| 3,260,661 | 7/1966 | Kemp et al. | 204—148 |
| 3,435,126 | 3/1969 | Hamilton | 174—78 |
| 3,452,318 | 6/1969 | Tanges | 339—251 |

TA HSUNG TUNG, Primary Examiner

U.S. Cl. X.R.

204—148, 286, 297; 339—95, 251